United States Patent
Wu et al.

(10) Patent No.: US 9,432,566 B2
(45) Date of Patent: Aug. 30, 2016

(54) CAMERA SYSTEM CAPABLE OF EXPANDING FUNCTIONS AND AN AMOUNT OF VIDEO STREAM

(71) Applicant: GeoVision Inc., Taipei (TW)

(72) Inventors: Chih-Ming Wu, New Taipei (TW); Chun-Kai Hsu, New Taipei (TW); Tsun-Jen Cheng, Taipei (TW)

(73) Assignee: GeoVision Inc., Taipei (TW)

( * ) Notice: Subject to any disclaimer, the term of this patent is extended or adjusted under 35 U.S.C. 154(b) by 158 days.

(21) Appl. No.: 14/328,730

(22) Filed: Jul. 11, 2014

(65) Prior Publication Data

US 2016/0014319 A1    Jan. 14, 2016

(51) Int. Cl.
*H04N 5/225* (2006.01)
*H04N 5/232* (2006.01)
*H04N 5/247* (2006.01)
*G03B 17/56* (2006.01)

(52) U.S. Cl.
CPC ........ *H04N 5/23206* (2013.01); *H04N 5/2252* (2013.01); *H04N 5/23209* (2013.01); *G03B 17/568* (2013.01); *H04N 5/247* (2013.01)

(58) Field of Classification Search
CPC .......... H04N 5/2251–5/2254; H04N 5/23203; H04N 5/23209; H04N 1/00299; H04N 7/18; H04N 7/141; H04N 7/181; H04N 7/185; H04N 5/247; G03B 17/56; G03B 17/568; G03B 17/48; H05K 5/00
USPC ................................................. 348/373, 375
See application file for complete search history.

(56) References Cited

U.S. PATENT DOCUMENTS

| 8,879,420 | B2 * | 11/2014 | Eichen ............... H04L 12/4633 361/600 |
| 8,902,315 | B2 * | 12/2014 | Fisher ................. H04M 1/6066 348/164 |
| 8,922,658 | B2 * | 12/2014 | Galvin ............... H04N 5/23206 348/143 |
| 2015/0181088 | A1 * | 6/2015 | Wu ..................... H04N 5/23203 348/14.01 |
| 2015/0334186 | A1 * | 11/2015 | Chen ...................... H04L 67/12 348/143 |

* cited by examiner

*Primary Examiner* — Ngoc-Yen Vu
(74) *Attorney, Agent, or Firm* — Winston Hsu; Scott Margo

(57) ABSTRACT

A camera system includes at least one IP camera apparatus and a central controlling apparatus. The IP camera apparatus includes a base module, a lens module and a first connector. The lens module is connected to the base module. A control unit of the base module is adapted to analyze information acquired by the lens module. The first connector is disposed on the base module. The central controlling apparatus includes at least one holder, a second connector and a controller. The base module is detachably disposed on the holder. The second connector is disposed on the at least one holder to electrically connect to the first connector since the central controlling apparatus is assembled with the IP camera apparatus. The controller is electrically connected to the second connector. The controller is adapted to set an address for the IP camera apparatus via the first connector and the second connector.

12 Claims, 7 Drawing Sheets

CAMERA SYSTEM CAPABLE OF EXPANDING FUNCTIONS AND AN AMOUNT OF VIDEO STREAM

BACKGROUND OF THE INVENTION

1. Field of the Invention

The present invention relates to a camera system, and more particularly, to a camera system including a central controlling apparatus and at least one IP camera apparatus assembled with each other to expand functions and an amount of video stream of the camera system.

2. Description of the Prior Art

An Internet protocol camera (IP camera), is a type of digital video camera commonly employed for surveillance, and which unlike analog closed circuit television (CCTV) cameras can send and receive data via a computer network and the Internet. Although most cameras that do this are webcams, the term "IP camera" or "netcam" is usually applied only to those used for surveillance. The IP camera includes the lens module and the controller, and the controller is electrically connected to the lens module to analyze information captured by the lens module. Each IP camera owns individual IP address since several IP cameras are assembled to establish a multi-sensor system. Conventional assembly of the IP cameras cannot provide extra functions, such as network connectivity, audio input/output, many types of sensors, etc. The extra functions are integrated into the IP camera in a customized sense, which results in limited expandability and operational inconvenience.

SUMMARY OF THE INVENTION

The present invention provides a camera system including a central controlling apparatus and at least one IP camera apparatus assembled with each other to expand functions and an amount of video stream of the camera system for solving above drawbacks.

According to the claimed invention, a camera system includes at least one IP camera apparatus and a central controlling apparatus. The IP camera apparatus includes a base module, a lens module and a first connector. The base module includes a control unit. The lens module is connected to the base module. The control unit is adapted to analyze information acquired by the lens module. The first connector is disposed on the base module. The central controlling apparatus includes at least one holder, a second connector and a controller. The base module is detachably disposed on the at least one holder. The second connector is disposed on the at least one holder to electrically connect to the first connector since the central controlling apparatus is assembled with the IP camera apparatus. The controller is electrically connected to the second connector. The controller is adapted to set an address for the IP camera apparatus via connection between the first connector and the second connector.

According to the claimed invention, the base module further includes a plurality of connecting ports electrically connected to the control unit. The IP camera apparatus further includes a plurality of functional modules detachably and interchangeably mounted to the plurality of connecting ports, and each functional module is formed into a unified block.

According to the claimed invention, each of the functional modules is selected from one of the following: an audio box, an access control unit, a fire detector, a Wi-Fi module, a GPS module, a 3G communication module, and a 4G/LTE communication module.

According to the claimed invention, the IP camera further comprises a power module detachably mounted to the base module.

According to the claimed invention, the central controlling apparatus further includes a plurality of holders and a plurality of second connectors. Each of the second connectors is disposed on the corresponding holder and electrically connected to the controller.

According to the claimed invention, the camera system further includes a plurality of IP camera apparatuses respectively disposed on the corresponding holder.

According to the claimed invention, the plurality of holders includes a main holder and at least one auxiliary holder. The IP camera apparatus disposed on the main holder is adapted to control function of the IP camera apparatus disposed on the auxiliary holder via the central controlling apparatus.

According to the claimed invention, the controller provides an address for assembly of the IP camera apparatuses.

According to the claimed invention, the camera system further includes an accessory module detachably and interchangeably disposed on one of the holders.

According to the claimed invention, the controller is adapted to detect whether the accessory module is assembled with the central controlling apparatus and to actuate function of the accessory module.

According to the claimed invention, the control unit analyzes the information of the lens module by function of the accessory module.

According to the claimed invention, the accessory module is selected from one of the following: an audio box, an access control unit, a fire detector, a Wi-Fi module, a GPS module, a 3G communication module, and a 4G/LTE communication module.

According to the claimed invention, the camera system further includes a plurality of central controlling apparatuses. A terminal of one of the central controlling apparatuses is electrically connected to a terminal of the other central controlling apparatus.

According to the claimed invention, the first connector and the second connector are RJ45 connectors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
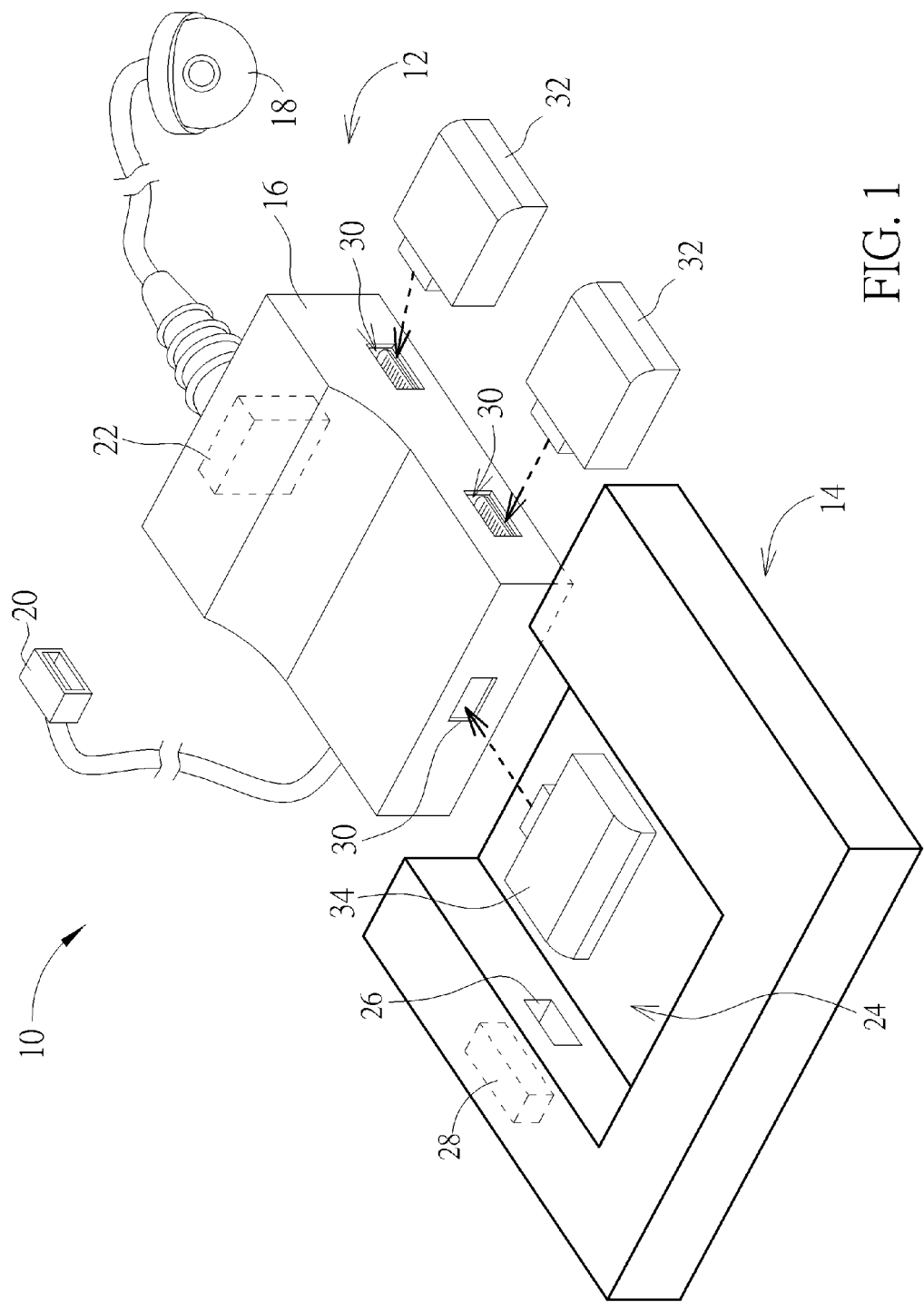
FIG. 1 is an exploded diagram of a camera system according to a first embodiment of the present invention.
Figure 2:
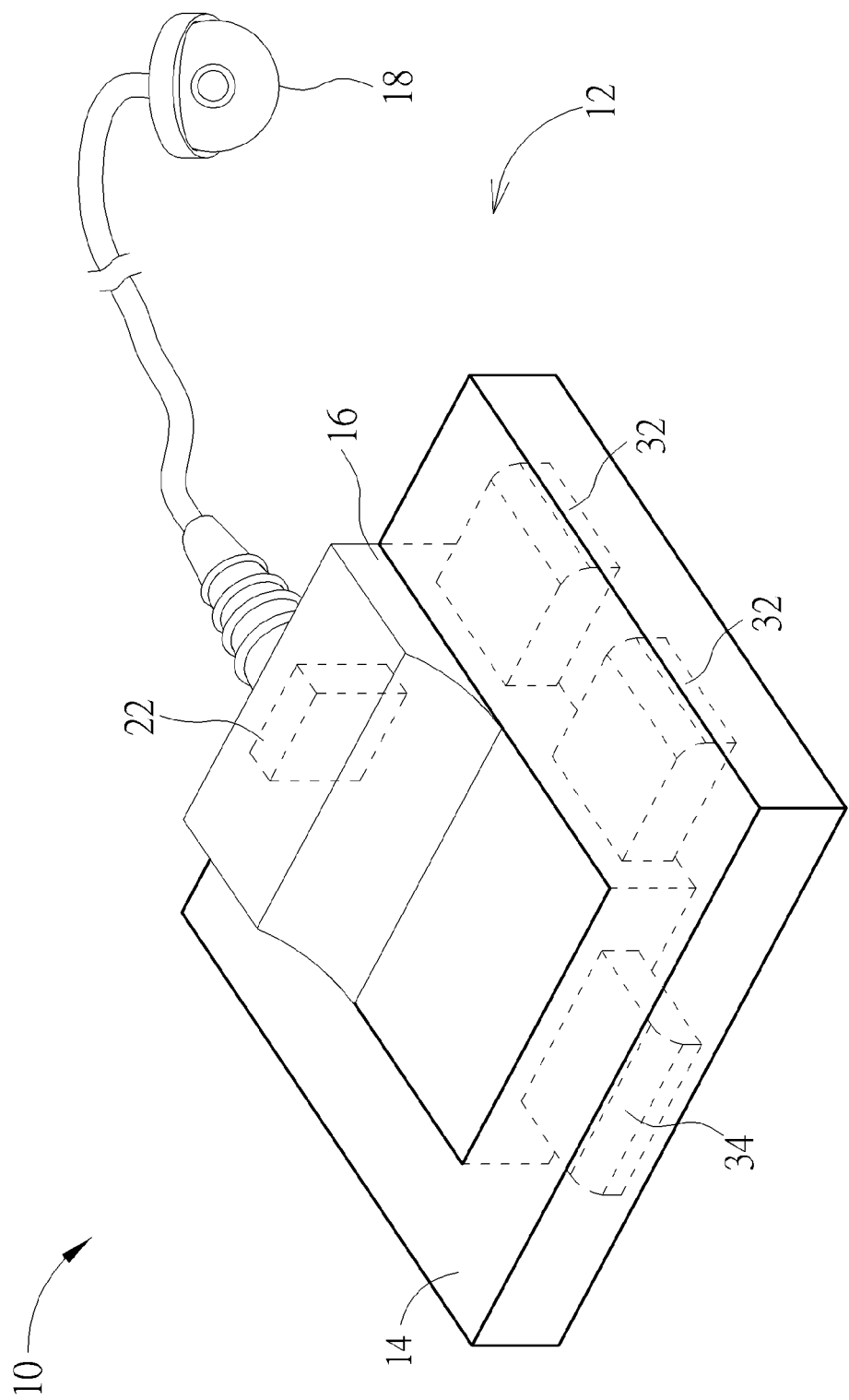
FIG. 2 is an assembly diagram of the camera system according to the first embodiment of the present invention.

Please refer to FIG. 1 and FIG. 2. FIG. 1 is an exploded diagram of a camera system 10 according to a first embodiment of the present invention. FIG. 2 is an assembly diagram of the camera system 10 according to the first embodiment of the present invention. The camera system 10 includes at least one IP camera apparatus 12 and a central controlling apparatus 14. The IP (Internet Protocol) camera apparatus 12 includes a base module 16, a lens module 18 and a first connector 20. The lens module 18 is connected to a control unit 22 of the base module 16. The control unit 22 is adapted to analyze information acquired by the lens module 18 so as to generate a video stream. The first connector 20 is disposed on the base module 16, preferably stretches from the base module 16 via a cable.

The central controlling apparatus 14 includes at least one holder 24, a second connector 26 and a controller 28. The second connector 26 is disposed on the holder 24 to electrically connect to the first connector 20 since the base module 16 is detachably disposed on the holder 24 to assemble the IP camera apparatus 12 with the central controlling apparatus 14. The controller 28 is electrically connected to the second connector 26. The controller 28 can set an IP address for the IP camera apparatus 12 via connection between the first connector 20 and the second connector 26, an amount of the IP camera apparatus 12 and functions of the IP camera apparatus 12 can be expanded to promote the camera system 10.

The base module 16 further includes a plurality of connecting ports 30 electrically connected to the control unit 22. The IP camera apparatus 12 may include a plurality of functional modules 32 detachably and interchangeably mounted to the plurality of connecting ports 30. Each of the functional modules 32 is formed into a unified block, and is preferably selected from one of the following: an audio box, an access control unit, a fire detector, a Wi-Fi module, a GPS module, a 3G communication module, and a 4G/LTE communication module. Amounts of the connecting ports 30 and the functional modules 32 are not limited to the above-mentioned embodiment, which depend on design's demand. Therefore, functions of the IP camera apparatus 12 can be expanded by characteristics of the functional modules 32. The IP camera apparatus 12 further includes a power module 34 detachably mounted to the connecting port 30 of the base module 16. The power module 34 can be an independent power supply of the camera system 10, so that the camera system 10 can be a portable device for operational convenience.

Figure 3:
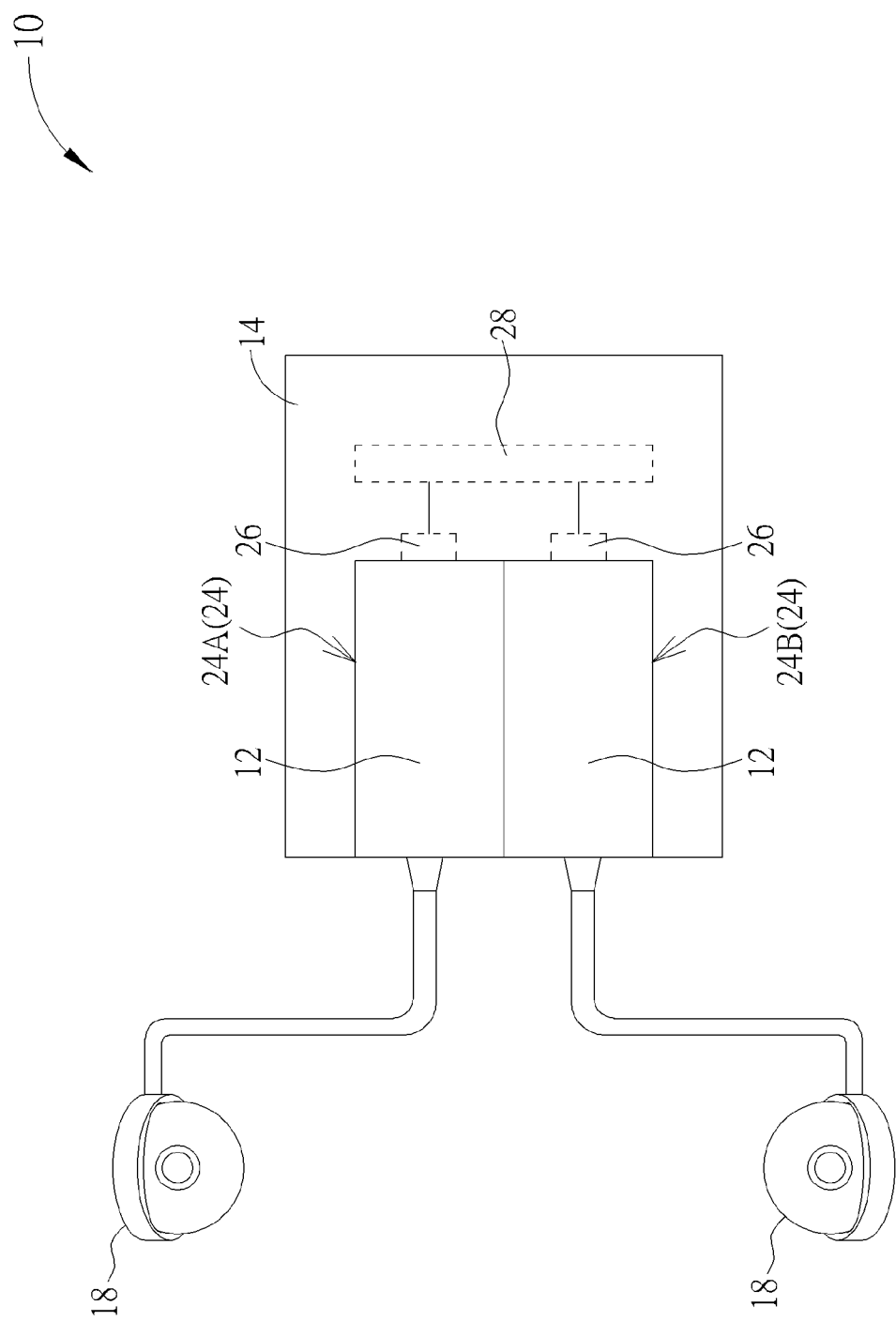
FIG. 3 is a diagram of the camera system according to a second embodiment of the present invention.

Please refer to FIG. 3. FIG. 3 is a diagram of the camera system 10 according to a second embodiment of the present invention. The central controlling apparatus 14' further includes a plurality of holders 24 and a plurality of second connectors 26. Each of the second connectors 26 is disposed on the corresponding holder 24 and electrically connected to the controller 28. The camera system 10 further includes a plurality of IP camera apparatuses 12 respectively disposed on the corresponding holder 24. The plurality of holders 24 can include the main holder 24A and the auxiliary holder 24B. An amount of the main holder 24A equals one, and an amount of the auxiliary holder 24B can be one or more. The IP camera apparatus 12 disposed on the main holder 24A is utilized to control functions of the IP camera apparatus 12 disposed on the auxiliary holder 24B via the central controlling apparatus 14'. It should be mentioned that the IP camera apparatuses 12 assembled with the central controlling apparatus 14' are integrated into integration and the controller 28 provides a single IP address for assembly of the IP camera apparatuses 12.

Figure 4:
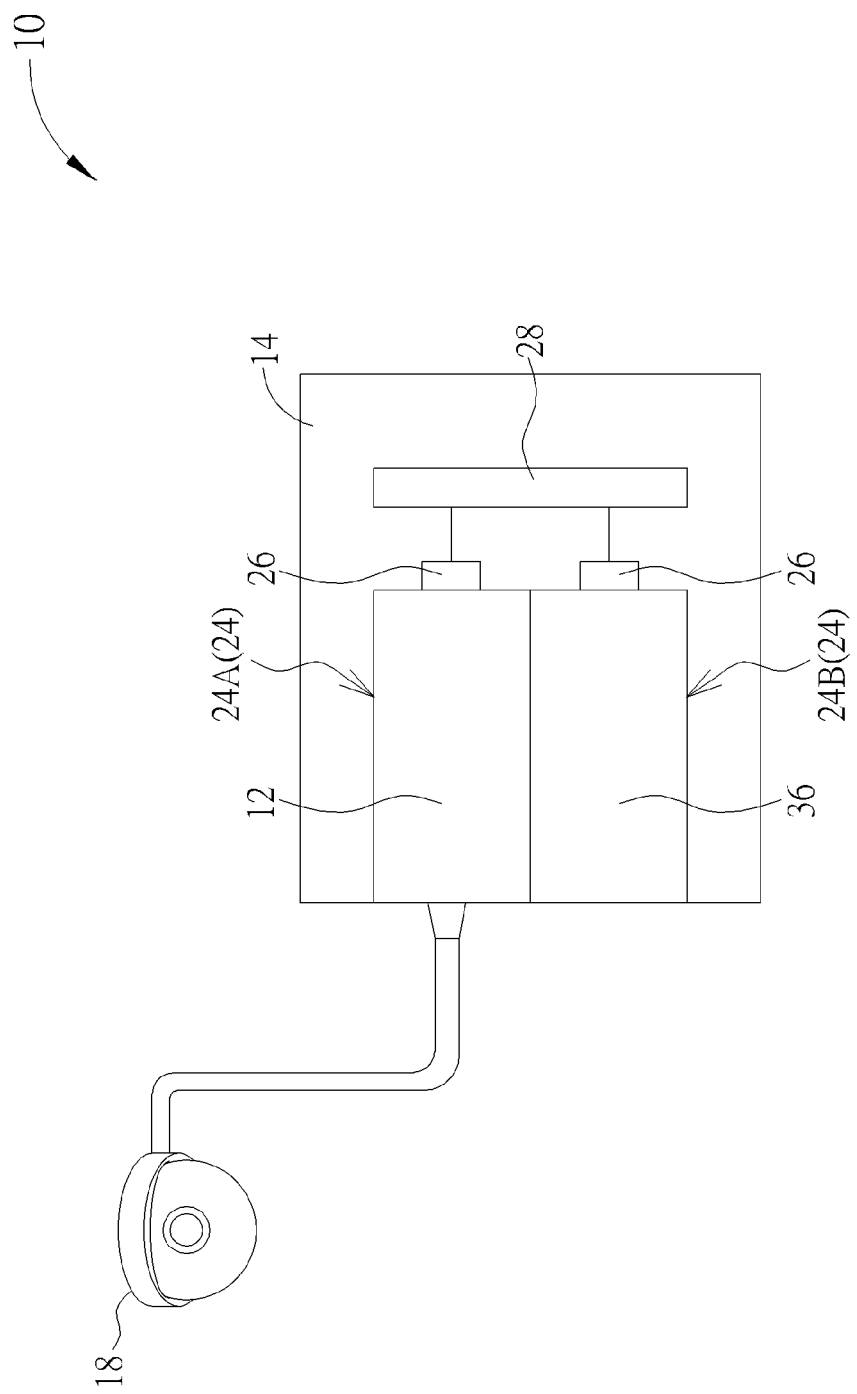
FIG. 4 is a diagram of the camera system according to a third embodiment of the present invention.

Please refer to FIG. 4. FIG. 4 is a diagram of the camera system 10 according to a third embodiment of the present invention. The camera system 10 further can include an accessory module 36 detachably and interchangeably disposed on one of the holders 24. The controller 28 of the central controlling apparatus 14' is adapted to detect whether the accessory module 36 is assembled with the auxiliary holder 24B of the central controlling apparatus 14', and to actuate function of the accessory module 36 since the accessory module 36 is established. The accessory module 36 is selected from one of the following: an audio box, an access control unit, a fire detector, a Wi-Fi module, a GPS module, a 3G communication module, and a 4G/LTE communication module. The control unit 22 of the IP camera apparatus 12 may analyze the information of the lens module 18 by function of the accessory module 36. For example, the control unit 22 mixes the video stream of the lens module 18 and an audio signal of the accessory module 36 (the audio box) into a monitoring videotape; the control unit 22 transmits the video stream of the lens module 18 to an external host via the wireless accessory module 36 (the Wi-Fi module, the 3G communication module, or the 4G/LTE communication module).

In each embodiment, elements having the same numeral as one of the other embodiments have the same structures and functions, and a detailed description is omitted herein for simplicity.

Figure 5:
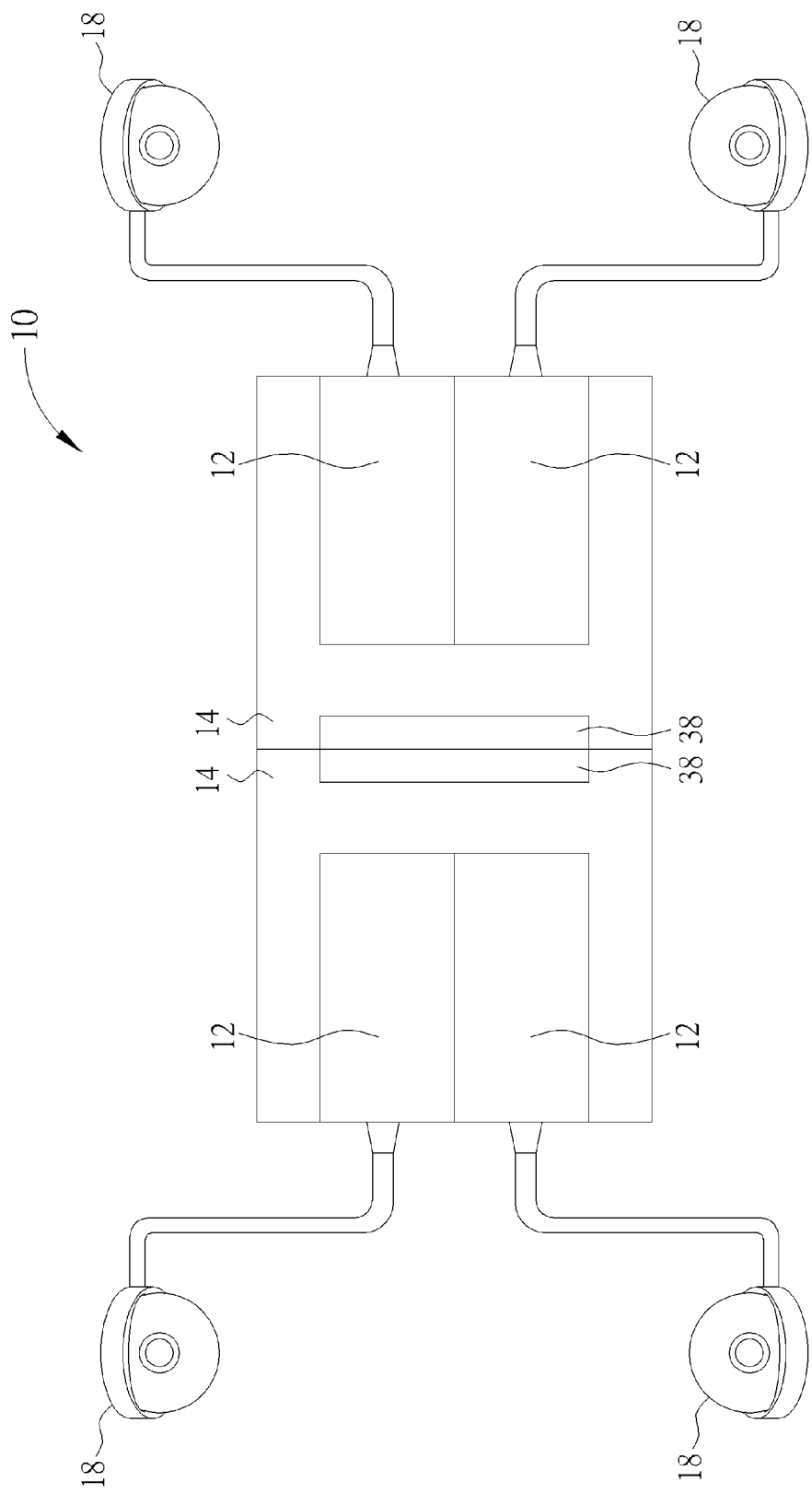
FIG. 5 to FIG. 7 respectively are diagrams of the camera system according to different embodiments of the present invention.
Figure 6:
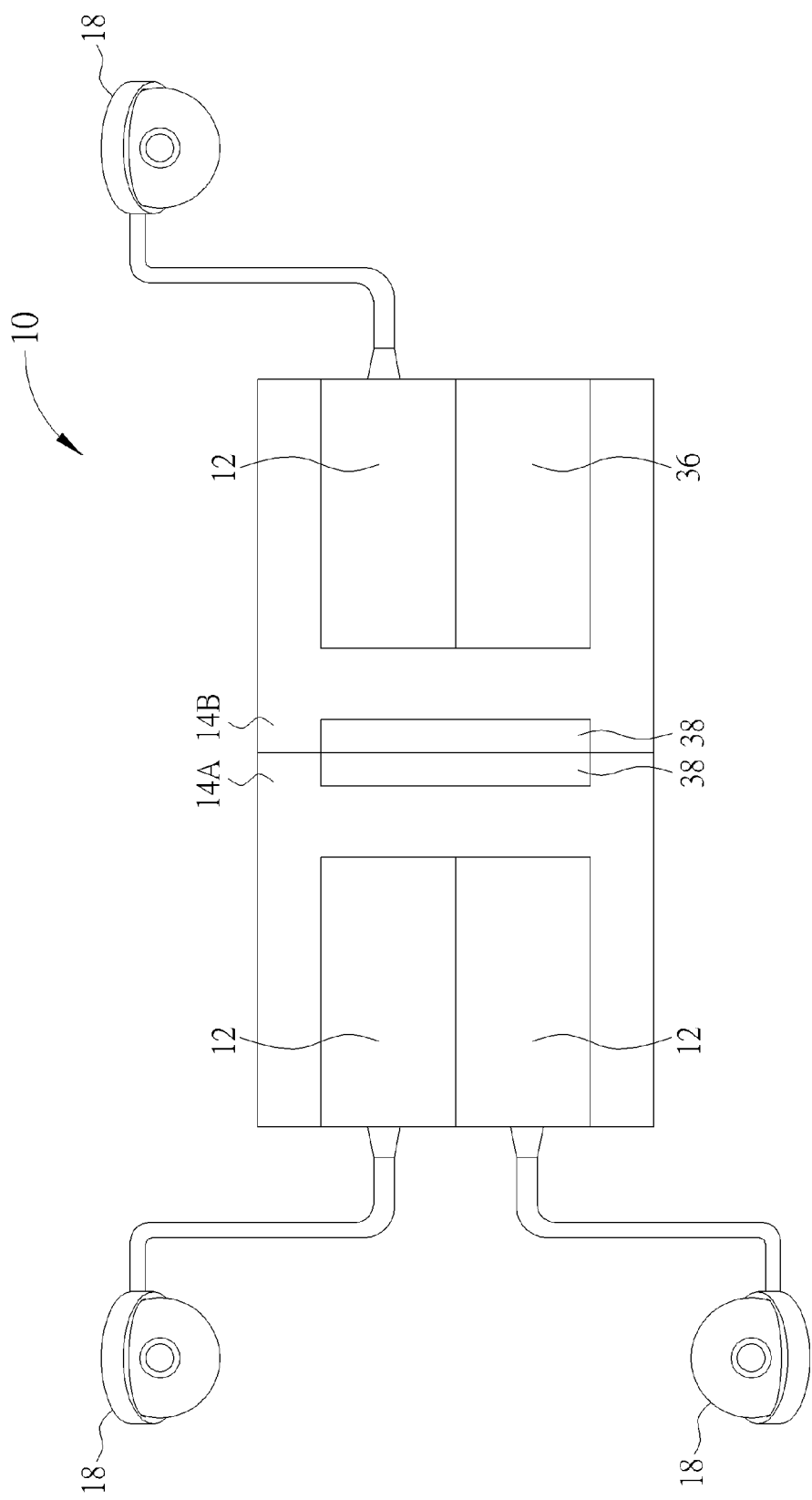
Figure 7:
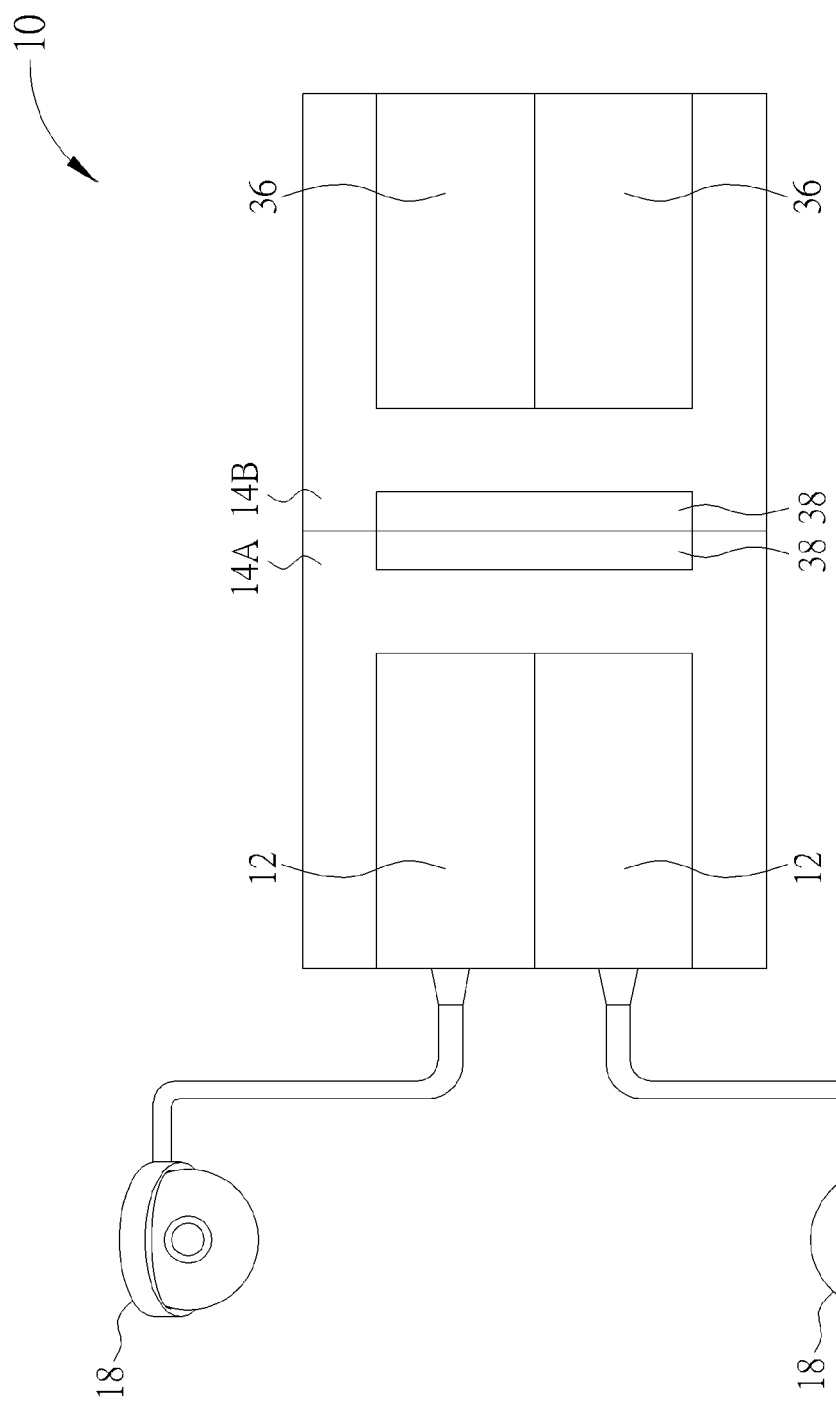

The camera system 10 further can include a plurality of central controlling apparatuses 14 assembled with each other. Each of the central controlling apparatuses 14 includes a corresponding terminal 38. The terminal 38 of one of the central controlling apparatuses 14 is electrically connected to the terminal 38 of the other central controlling apparatus 14, and resources of different central controlling apparatuses 14 can be shared to promote efficiency of the camera system 10. Please refer to FIG. 5 to FIG. 7. FIG. 5 to FIG. 7 respectively are diagrams of the camera system 10 according to different embodiments of the present invention. As shown in FIG. 5, each of the central controlling apparatuses 14 is assembled with two IP camera apparatuses 12, and the central controlling apparatuses 14 are assembled by the terminals 38. Each of the IP camera apparatuses 12 may has own network cards; however, the camera system 10 only provides single one IP address to represent the integration of the whole IP camera apparatuses 12, and utilizes the IP camera apparatus 12 disposed on the main holder 24A of the central controlling apparatus 14, which is firstably connected to the external host, to control functions of the other IP camera apparatuses 12.

As shown in FIG. 6, one of the central controlling apparatuses 14 (the central controlling apparatus 14A) is assembled with the two IP camera apparatuses 12, and the other central controlling apparatus 14B is assembled with the IP camera apparatus 12 and the accessory module 36. The controller 28 of the central controlling apparatus 14B detects whether the accessory module 36 is accurately assembled and then to actuate functions of the accessory module 36. Therefore, the IP camera apparatus 12 disposed on the main holder 24A of the central controlling apparatus 14, which is firstably connected to the external host, can utilize the accessory module 36 to analyze the information of the whole IP camera apparatuses 12 of the camera system 10. The camera system 10 only provides single one IP address to represent the integration of the whole IP camera apparatuses 12.

As shown in FIG. 7, the holders 24 of the right-side central controlling apparatus 14 are entirely accommodated with the accessory modules 36, and the left-side central controlling apparatus 14 at least includes one IP camera apparatus 12 disposed on the main holder 24A. The controller 28 of the central controlling apparatus 14B detects and actuates the accessory modules 36. The central controlling apparatus 14A provides single one IP address to represent the camera system 10, no matter how many IP camera apparatus exists in the central controlling apparatuses 14A, 14B.

In conclusion, the present invention utilizes the central controlling apparatus to integrate several IP camera apparatus into the unity, and the camera system with the plurality of IP camera apparatus only has one IP address. The first connector and the second connector preferably are RJ45 connectors to commonly assemble the IP camera apparatus with the central controlling apparatus. Connection between the central controlling apparatus and the accessory module may be set by a predetermined universal I/O port. Each of the IP camera apparatuses includes the connecting ports detachably and interchangeably mounted to the functional modules and the power module for functional expansion. Each of the central controlling apparatuses includes the holders detachably and interchangeably assembled with the IP camera apparatus and the accessory module, so as to establish the multi-sensor camera system that has the single IP address by conflict estimation of the controller of the central controlling apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera system comprising:
   a plurality of IP camera apparatuses, each of the plurality of IP camera apparatuses comprising:
      a base module, the base module comprising a control unit;
      a lens module connected to the base module, the control unit being adapted to analyze information acquired by the lens module; and
      a first connector disposed on the base module; and
   a central controlling apparatus, comprising:
      a plurality of holders whereon the plurality of IP camera apparatuses is respectively disposed, the base module being detachably disposed on one of the plurality of holders, the plurality of holders comprising a main holder and at least one auxiliary holder;
      a second connector disposed on the at least one holder to electrically connect to the first connector since the central controlling apparatus is assembled with the IP camera apparatus; and
      a controller electrically connected to the second connector, the controller being adapted to set an address for the IP camera apparatus via connection between the first connector and the second connector;
   wherein the IP camera apparatus disposed on the main holder is adapted to control function of the IP camera apparatus disposed on the auxiliary holder via the central controlling apparatus.

2. The camera system of claim 1, wherein the base module further comprises a plurality of connecting ports electrically connected to the control unit, the IP camera apparatus further comprises a plurality of functional modules detachably and interchangeably mounted to the plurality of connecting ports, and each functional module is formed into a unified block.

3. The camera system of claim 2, wherein each of the functional modules is selected from one of the following: an audio box, an access control unit, a fire detector, a Wi-Fi module, a GPS module, a 3G communication module, and a 4G/LTE communication module.

4. The camera system of claim 1, wherein the IP camera further comprises a power module detachably mounted to the base module.

5. The camera system of claim 1, wherein the central controlling apparatus further comprises a plurality of second connectors, each of the second connectors is disposed on the corresponding holder and electrically connected to the controller.

6. The camera system of claim 1, wherein the controller provides an address for assembly of the IP camera apparatuses.

7. The camera system of claim 1, further comprising:
   an accessory module detachably and interchangeably disposed on one of the holders.

8. The camera system of claim 7, wherein the controller is adapted to detect whether the accessory module is assembled with the central controlling apparatus and to actuate function of the accessory module.

9. The camera system of claim 7, wherein the control unit analyzes the information of the lens module by function of the accessory module.

10. The camera system of claim 7, wherein the accessory module is selected from one of the following: an audio box, an access control unit, a fire detector, a Wi-Fi module, a GPS module, a 3G communication module, and a 4G/LTE communication module.

11. The camera system of claim 1, wherein the camera system further comprises a plurality of central controlling apparatuses, a terminal of one of the central controlling apparatuses is electrically connected to a terminal of the other central controlling apparatus.

12. The camera system of claim 1, wherein the first connector and the second connector are RJ45 connectors.

* * * * *